United States Patent
Samra

(10) Patent No.: US 8,694,976 B2
(45) Date of Patent: Apr. 8, 2014

(54) SLEEP STATE MECHANISM FOR VIRTUAL MULTITHREADING

(75) Inventor: Nicholas G. Samra, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1887 days.

(21) Appl. No.: 10/742,707

(22) Filed: Dec. 19, 2003

(65) Prior Publication Data

US 2005/0138629 A1   Jun. 23, 2005

(51) Int. Cl.
*G06F 9/44* (2006.01)

(52) U.S. Cl.
USPC ............................ 717/151; 717/154; 718/104

(58) Field of Classification Search
USPC .......... 717/120, 130, 154; 718/103, 104, 106; 712/1, 228
See application file for complete search history.

(56) References Cited

U.S. PATENT DOCUMENTS

| | | | | |
|---|---|---|---|---|
| 4,852,083 A | * | 7/1989 | Niehaus et al. | 370/381 |
| 5,410,300 A | * | 4/1995 | Gould et al. | 340/2.2 |
| 5,692,193 A | * | 11/1997 | Jagannathan et al. | 718/106 |
| 5,933,627 A | * | 8/1999 | Parady | 712/228 |
| 6,016,542 A | * | 1/2000 | Gottlieb et al. | 712/225 |
| 6,212,544 B1 | * | 4/2001 | Borkenhagen et al. | 718/103 |
| 6,272,520 B1 | | 8/2001 | Sharangpani et al. | |
| 6,286,104 B1 | * | 9/2001 | Buhle et al. | 726/4 |
| 6,341,347 B1 | * | 1/2002 | Joy et al. | 712/228 |
| 6,377,912 B1 | * | 4/2002 | Sample et al. | 703/28 |
| 6,438,569 B1 | * | 8/2002 | Abbott | 708/603 |
| 6,493,741 B1 | * | 12/2002 | Emer et al. | 718/107 |
| 6,567,839 B1 | * | 5/2003 | Borkenhagen et al. | 718/103 |
| 6,697,935 B1 | * | 2/2004 | Borkenhagen et al. | 712/228 |
| 6,721,944 B2 | * | 4/2004 | Chaudhry et al. | 717/154 |
| 7,155,721 B2 | * | 12/2006 | Safford et al. | 718/104 |
| 2001/0047468 A1 | * | 11/2001 | Parady | 712/228 |
| 2002/0023184 A1 | * | 2/2002 | Paul | 710/100 |

(Continued)

FOREIGN PATENT DOCUMENTS

DE   10353268 B3   7/2005
JP   2002140200   5/2002

(Continued)

OTHER PUBLICATIONS

Wikipedia, "Turing machine", downloaded from <http://en.wikipedia.org/wiki/Turing_machine> on Oct. 5, 2010.*

(Continued)

*Primary Examiner* — Jason Mitchell
(74) *Attorney, Agent, or Firm* — Mnemoglyphics, LLC; Lawrence M. Mennemeier

(57) ABSTRACT

Method, apparatus and system embodiments provide support for multiple SoEMT software threads on multiple SMT logical thread contexts. A sleep state mechanism maintains a current value of an element of architecture state for each physical thread. The current value corresponds to an active virtual thread currently running on the physical thread. The sleep state mechanism also maintains sleep values of the architecture state element for each inactive thread. The active and inactive values may be maintained in a cross-bar configuration. Upon a read of the architecture state element, simplified mux logic selects among the current values to provide the current value for the appropriate active thread. Upon a thread switch, control logic associated with the sleep state mechanism swaps the active state value for the current thread with the inactive state value for the new thread.

30 Claims, 8 Drawing Sheets

(56) References Cited

U.S. PATENT DOCUMENTS

| | | | |
|---|---|---|---|
| 2002/0078011 A1* | 6/2002 | Lee et al. | 707/1 |
| 2002/0083252 A1* | 6/2002 | Armstrong et al. | 710/260 |
| 2002/0087843 A1* | 7/2002 | Kottapalli | 712/228 |
| 2002/0087844 A1* | 7/2002 | Walterscheidt et al. | 712/228 |
| 2003/0046521 A1* | 3/2003 | Shoemaker | 712/228 |
| 2003/0172256 A1* | 9/2003 | Soltis et al. | 712/228 |
| 2003/0191927 A1* | 10/2003 | Joy et al. | 712/228 |
| 2004/0088488 A1* | 5/2004 | Ober et al. | 711/125 |
| 2004/0151211 A1* | 8/2004 | Snider | 370/534 |
| 2006/0242388 A1* | 10/2006 | Tremblay et al. | 712/228 |
| 2006/0288190 A1* | 12/2006 | Shoemaker | 712/1 |
| 2008/0082751 A1* | 4/2008 | Okin et al. | 711/115 |

FOREIGN PATENT DOCUMENTS

| | | |
|---|---|---|
| WO | WO 99/21081 | 4/1999 |
| WO | WO 99/21083 | 4/1999 |
| WO | 2005/066781 A2 | 7/2005 |
| WO | 2005/066781 A3 | 5/2006 |

OTHER PUBLICATIONS

Wikipedia, "Turing completeness", downloaded from <http://en.wikipedia.org/wiki/Turing_completeness> on Oct. 5, 2010.*

PCT/US2004/041104 International Search Report and Written Opinion Mailed Feb. 24, 2006.

Ungerer et al—A Survey of Processors With Explicit Multithreading—vol. 35, No. 1—Mar. 2003—pp. 29-63.

Byrd et al—Multithreaded Processor Architectures—vol. 32, No. 8—Aug. 1, 1995—pp. 38-46.

International Preliminary Report on Patentability and Written Opinion received for PCT Application No. PCT/US2004/041104, Mailed on Jun. 29, 2006, 7 pages.

Koufatny et al., "Hyperthreading technology in the netburst microarchitecture", IEEE Micro., vol. 23, Mar.-Apr. 2003, pp. 56-65. Abstract only.

Office Action Received for German Patent Application No. 11 2004 002 267.3-53 mailed on Aug. 22, 2007, 6 Pages of Office Action including english Translation.

Office Action Received for German Patent Application No. 11 2004 002 267.3-53 mailed on Aug. 24, 2009, 2 Pages of Office Action including english Translation.

Office Action Received for Chinese Patent Application No. 200480036855.4 mailed on Jan. 4, 2008, 9 Pages of Office Action including english Translation.

* cited by examiner

SLEEP STATE MECHANISM FOR VIRTUAL MULTITHREADING

BACKGROUND

1. Technical Field

The present disclosure relates generally to information processing systems and, more specifically, to a mechanism that maintains the architectural state values for both active and inactive software threads that may be executed on a processor having multiple logical processors.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance through additional transistors, other performance enhancements involve software techniques. One software approach that has been employed to improve processor performance is known as "multithreading." In software multithreading, an instruction stream may be split into multiple instruction streams that can be executed in parallel. Alternatively, independent software threads may be executed concurrently.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple threads concurrently. In another approach, referred to as simultaneous multithreading ("SMT"), a single physical processor is made to appear as multiple logical processors to operating systems and user programs. For SMT, multiple threads can be active and execute concurrently on a single processor without switching. That is, each logical processor maintains a complete set of the architecture state, but many other resources of the physical processor, such as caches, execution units, branch predictors control logic and buses are shared. For SMT, the instructions from multiple software threads may thus execute concurrently on each logical processor.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of an apparatus, system and method for a mechanism that maintains architectural state values for multiple SoEMT software threads supported on multiple SMT logical thread contexts.

DETAILED DESCRIPTION

In the following description, numerous specific details such as processor types, multithreading environments, microarchitectural structures, architectural state elements, and thread switching methodology have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

A particular hybrid of multithreading approaches is disclosed herein. Particularly, a combination of SoEMT and SMT multithreading approaches is referred to herein as a "Virtual Multithreading" environment. For SMT, two or more software threads may run concurrently in separate logical contexts. For SoEMT, only one of multiple software threads is active in a logical context at any given time. These two approaches are combined in Virtual Multithreading. In Virtual Multithreading, each of two or more logical contexts supports two or more SoEMT software threads, referred to as "virtual threads."

For example, three virtual software threads may run on an SMT processor that supports two separate logical thread contexts. Any of the three software threads may begin running, and then go into an inactive state upon occurrence of an SoEMT trigger event. The inactive state may be referred to herein as a "sleep" state, although the term "sleep state" is not intended to be limiting as used herein. "Sleep state" thus is intended to encompass, generally, the inactive state for an SoEMT thread.

Because expiration of a TMUX multithreading timer may be considered a type of SoEMT trigger event, the use of the term "SoEMT" with respect to the embodiments described herein is intended to encompass multithreading wherein thread switches are performed upon the expiration of a TMUX timer, as well as upon other types of trigger events, such as a long latency cache miss, execution of a particular instruction type, and the like.

When resumed, a sleeping software thread need not resume in the same logical context in which it originally began execution—it may resume either in the same logical context or in another logical context. In other words, a virtual software thread may switch back and forth among logical contexts over time. Disclosed herein is a mechanism to maintain architectural state values for multiple active and inactive software threads in order to support the hybrid Virtual Multithreading (VMT) environment.

Figure 1:
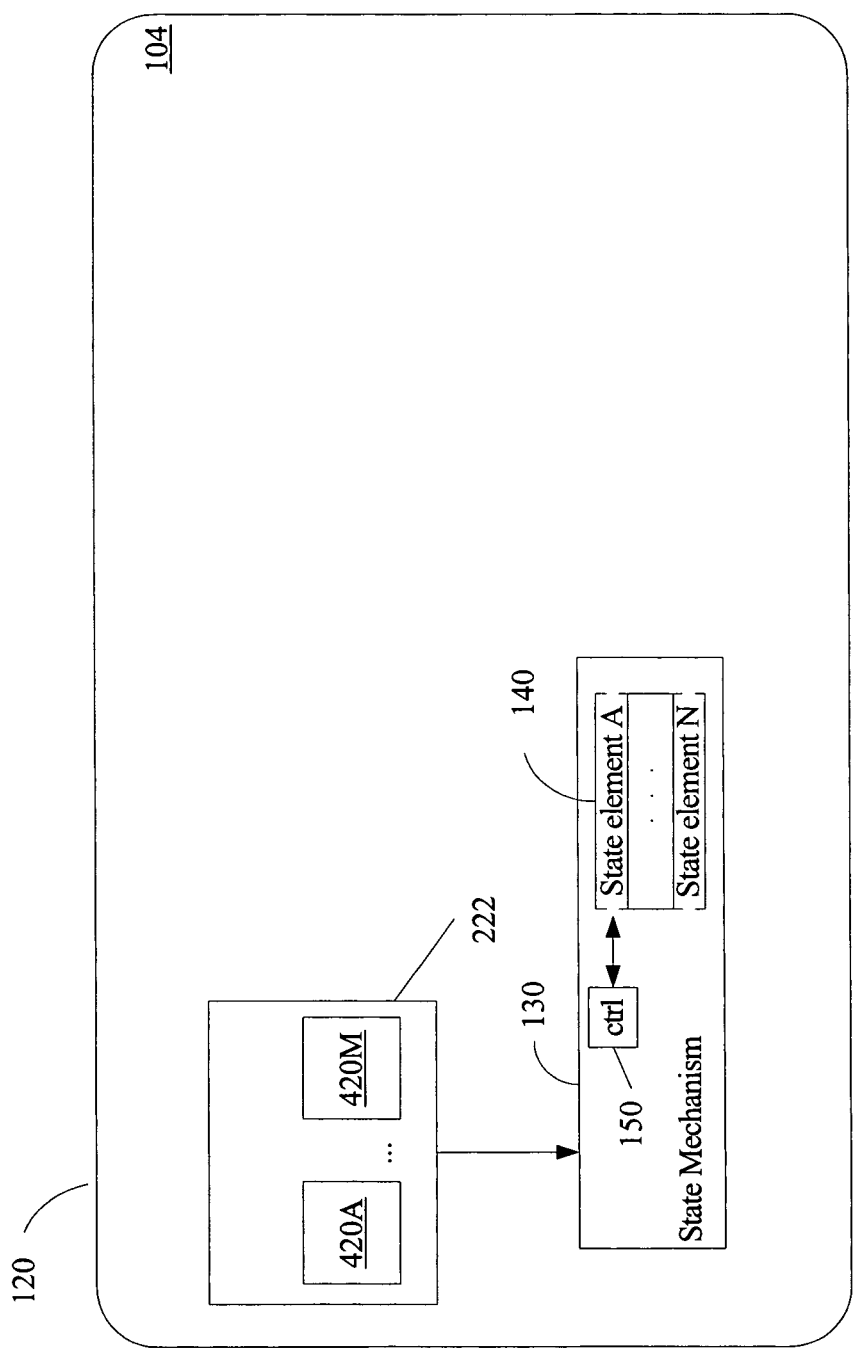
FIG. 1 is a block diagram of at least one embodiment of a multi-threaded processor that includes a state mechanism as disclosed herein.

FIG. 1 is a block diagram illustrating a processor 104 capable of performing disclosed techniques to maintain architectural state for a plurality of VMT software threads in a manner that maintains relatively low hardware overhead, has little or no adverse affect on critical timing paths, and supports retrofitting of an SMT processor to support virtual multithreading.

The processor 104 may include a front end 120 that prefetches instructions that are likely to be executed. For at least one embodiment, the front end 120 includes a fetch/decode unit 222 that includes logically independent sequencers 420A-420M for each of two or more physical thread contexts. The physical thread contexts may also be interchangeably referred to herein as "logical processors" and/or "physical threads." The single physical fetch/decode unit 222 thus includes a plurality of logically independent sequencers 420A-420M, each corresponding to one of M physical threads.

FIG. 1 illustrates that at least one embodiment of the processor 104 includes a state mechanism 130. The state mechanism 130 maintains the value for one or more architectural state elements 140. A copy of the architectural state element 140 is maintained for each of the N virtual threads. The architectural state element may be any storage element that maintains an element of the architectural state for the processor 104. The state element 140 may thus be, for instance, a latch, a register, a register array, or the like. For example, state element 140 may be a particular control register or general register.

While the state mechanism 130 embodiments disclosed herein may be practiced to maintain and swap active and inactive state element values for a plurality (N) of SoEMT software threads on a single physical thread, for at least one embodiment M≥2.

FIG. 1 also illustrates that the state mechanism 130 may further include control logic 150. The control logic 150 allows normal write updates to the appropriate copy of the architectural state element 140 during execution of the associated virtual thread.

The control logic 150 also performs a state-selection function such that the appropriate thread-specific state element 140 value is provided to the processor when an access, such as a read, of the state element is performed. As is discussed in further detail below, such selection function is performed via simplified mux logic that minimizes the timing involved with selecting the value of the appropriate copy of the state element for such an access request.

For at least one embodiment, the thread-specific state element values are maintained in a bifurcated scheme of active and inactive state element values. By maintaining only one current active state element value for each of the M physical threads, state-selection muxing for N virtual threads on M physical threads may be performed by an M-way mux rather than an N-way mux (see discussion of FIGS. 2-5, below).

In addition to the state-selection function, the control logic 150 also performs a swap of an active state element value with an inactive state element value during a virtual thread switch. Such swap processing is discussed in further detail below.

The state mechanism 130 may thus include control logic 150 to maintain, swap and select state element values for N software threads. The depiction in FIG. 1 of the state mechanism 130 as including state elements 140A-140N should not be taken to be limiting. For at least one embodiment, for example, the state mechanism 130 may include only control logic 150, and may be coupled to state element storage structures 140A-140N. For at least one other embodiment, for example, state mechanism 130 may include control logic 150 as well as M-N storage structures to maintain inactive state element values. Such embodiment of the state mechanism 130 may be coupled to storage elements for M active state element values.

Figure 2:
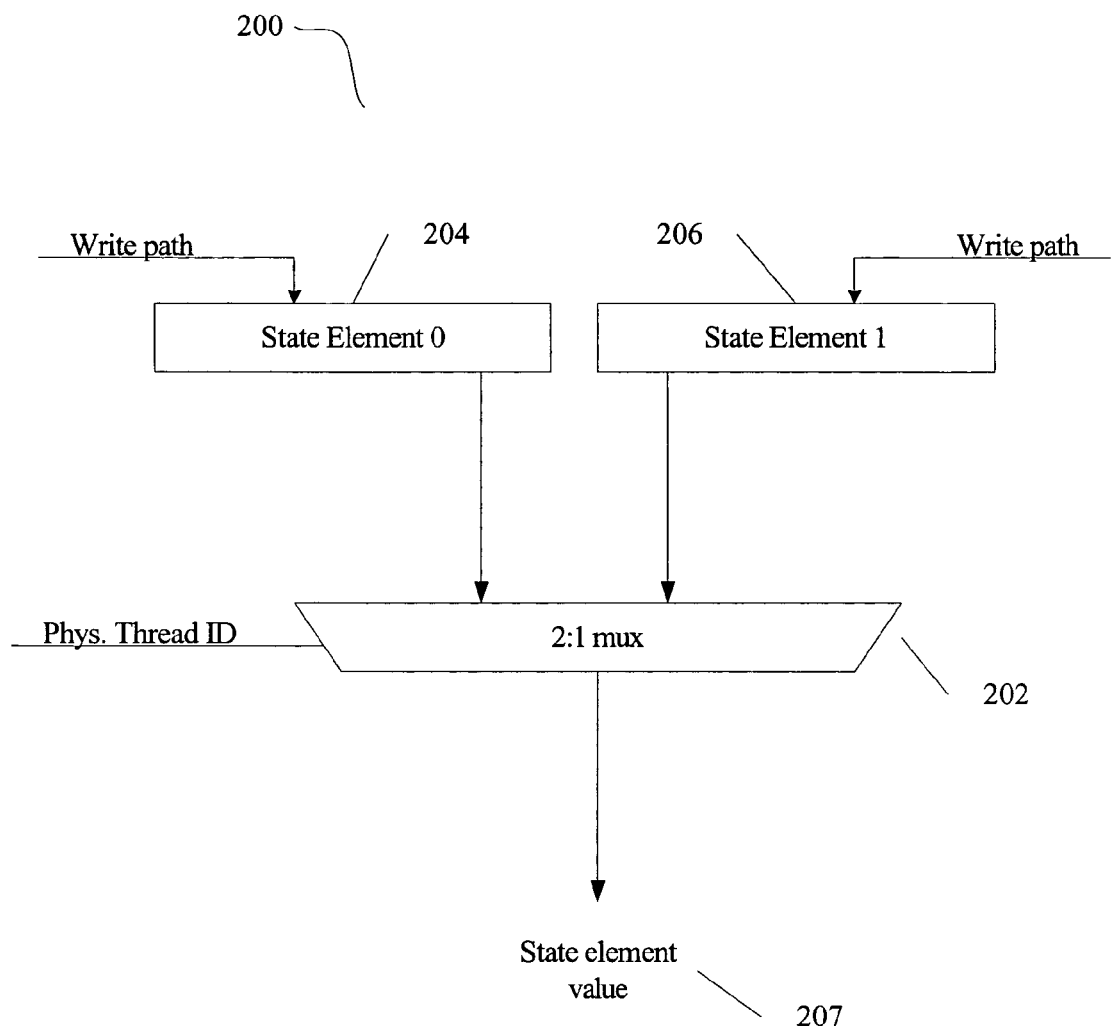
FIG. 2 is a block diagram of prior art M-way state-selection mux logic for an SMT processor that provides 2 logical processors.

FIG. 2 illustrates a relatively simple prior art M:1 mux selection logic 200 that provides an appropriate state element value in a traditional SMT environment that runs a single software thread on each of M logical processors. Utilizing the physical thread identifier as a selection input, a 2:1 mux 202 is utilized to select the proper value from among two current state element storage structures 204, 206. Although a scheme involving only two physical threads is illustrated in FIG. 2, one of skill in the art will recognize that more than two physical threads may be supported with additional state elements and a larger mux.

Figure 3:
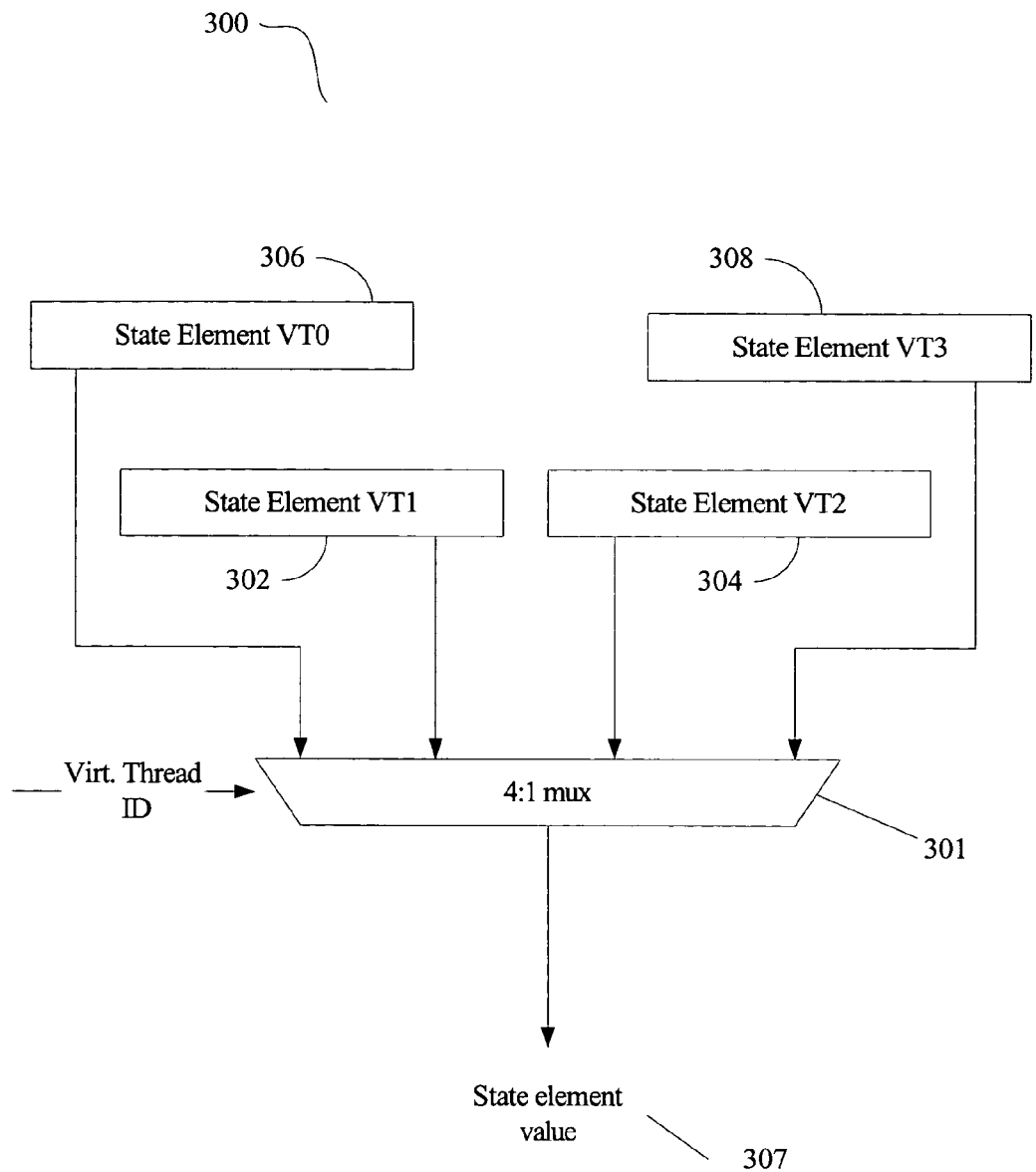
FIG. 3 is a block diagram of at least one embodiment of N-way state-selection mux logic for an SMT processor that provides two logical processors and supports four (N) virtual software threads.

FIG. 3 illustrates at least one embodiment of N:1 mux selection logic 300 that may be utilized to select the proper value from among N current state element storage structures 302, 304, 306, 308. Such embodiment 300 might be utilized, for example, to perform state selection logic for a SMT processor that supports N virtual software threads on M physical threads. In such embodiment, an N-way mux 301 may be utilized to select the value of one of the state elements 302, 304, 306, 308, based on a virtual thread identifier that is used as a selection input.

One will note that, in comparison to the 2:1 mux logic 200 illustrated in FIG. 2, the FIG. 3 logic 300 requires additional hardware overhead in that a multi-bit virtual thread identifier is used as the selection input, since more than two states are involved in the mux logic.

It should also be noted that the mux logic 300 illustrated in FIG. 3 may provide unacceptable timing delay. That is, a 4:1 mux 301 typically requires more time to generate its output value 307 than a 2:1 mux requires. The timing delay for state selection is often critical because the accessing of architectural state is often on the critical path for many functional units of a processor.

Figure 4:
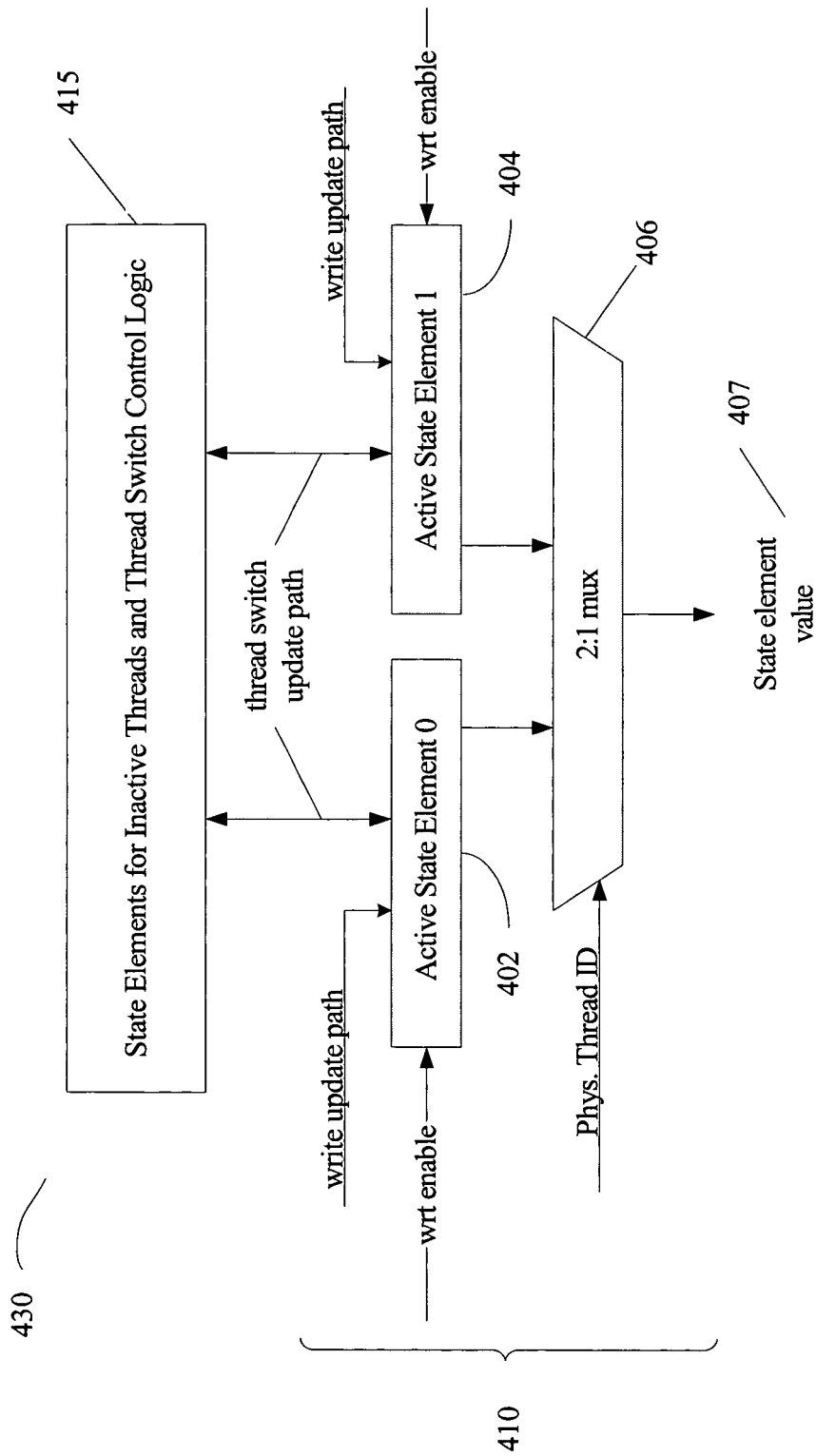
FIG. 4 is a block diagram illustrating at least one embodiment of a state mechanism that utilizes simplified M-way state-selection mux logic for an SMT processor that provides two (M) logical processors and supports four (N) virtual software threads.

FIG. 4 illustrates an embodiment of a state mechanism 430 that may utilize the efficient M:1 mux scheme illustrated in FIG. 2 while at the same time maintaining state for N virtual threads. For at least one embodiment of the state mechanism 430, N>M≥2. While FIG. 4 illustrates a specific embodiment where M=2 and N=4, one of skill in the art will recognize that many other values of M and N might be used without departing from the general concepts illustrated in FIG. 4.

FIG. 4 illustrates state-selection logic 410 to provide an output value 407 for a read access of an architectural element value. FIG. 4, in comparison with FIG. 2, illustrates that the state-selection logic 410 is no more complex than a traditional M-way state-selection mux scheme (see 200, FIG. 2) that performs state-selection logic among M state element values, where M is the number of physical threads. The shaded boxes of FIG. 4 illustrate that the simplified state-selection mux scheme of FIG. 200 is maintained.

However, FIG. 4 further illustrates that the state mechanism 430 may maintain additional state element values for inactive threads and also includes additional thread switch logic to swap out the value of an active state element (402, 404) with the value for an inactive state element upon a thread switch. The additional inactive state element storage structures and the thread switch logic are referred to collectively in FIG. 4 by reference numeral 415.

FIG. 4 illustrates a bifurcated scheme for tracking state element values. Those state element values for virtual threads that are currently executing on each of the M physical threads are referred to as "active" state element values. Such active state element values are maintained in storage structures 402, 404 that are available to the mux 406 that performs an M-way selection function in order to provide the appropriate state element value 407 for an access operation.

In addition, the additional portion 415 of the state mechanism 430 includes storage areas to maintain an additional value of the state element for each additional inactive virtual thread. For example, if the processor supports three virtual software threads on two physical threads, then the mux selection logic 410 maintains an active value (see 402, 404) of the state element for each of the physical threads, and the additional portion 415 of the state machine 430 maintains a "sleeping" state element value for the third virtual thread.

Of course, for embodiments wherein separate state mechanisms 430 are maintained for each of the M physical threads' state element, or where M=1, the mux 406 is not present because only one active storage element value 402 or 404 is maintained by the state mechanism 430. Nonetheless, for such embodiments an inactive state element value and swap logic (see 415) may be utilized to maintain and swap active and inactive values responsive to software thread switches.

Figure 5:
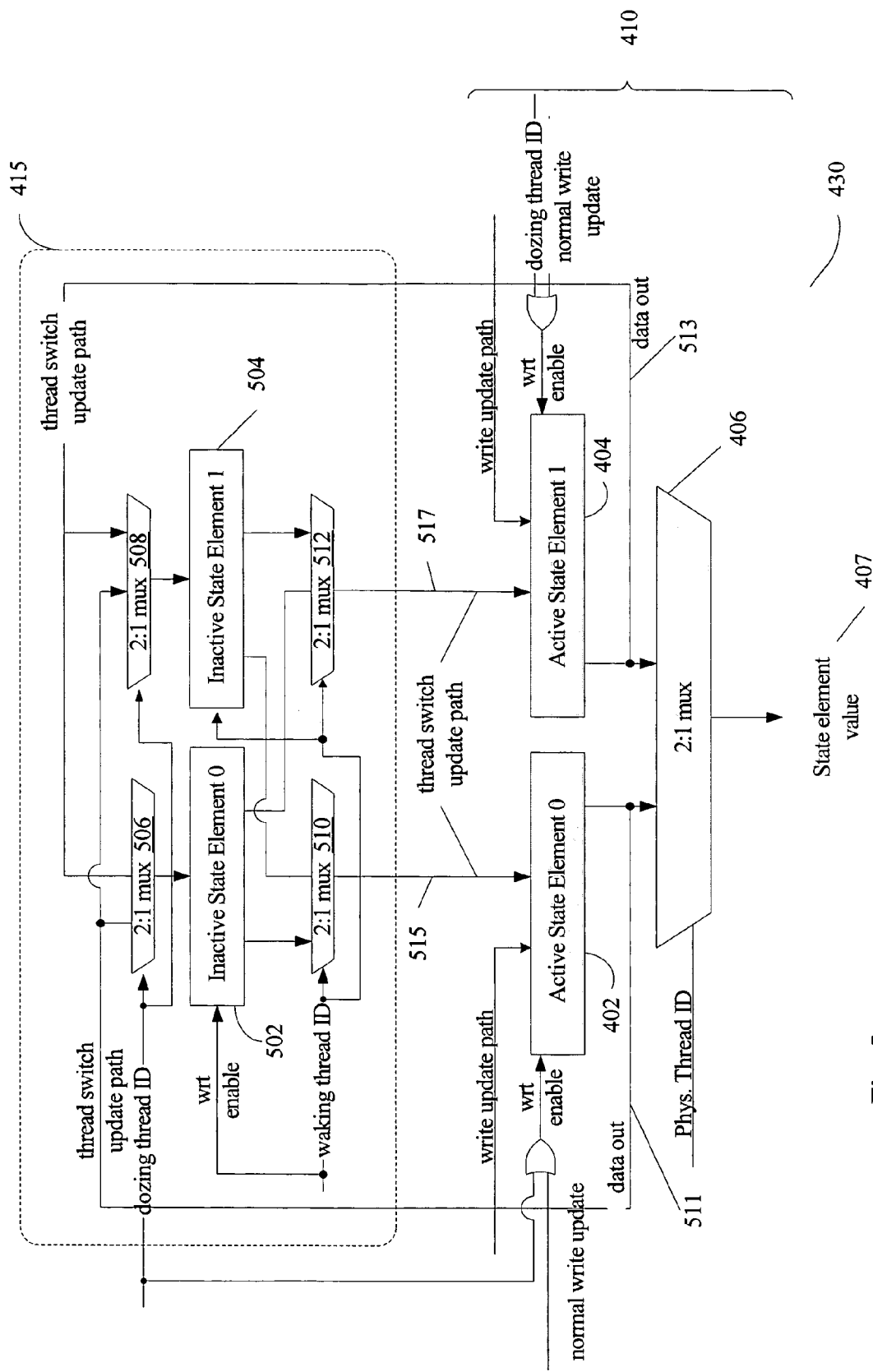
FIG. 5 is a block diagram illustrating further detail for at least one embodiment of a state mechanism.

FIG. 5 illustrates at least one embodiment of the state mechanism 430 of FIG. 4 in further detail. The state mechanism embodiment 430 illustrated in FIG. 5 is intended to be illustrative only, and provides an example state mechanism 430 that supports four (N) virtual software threads on two (M) physical threads. However, such specific values for M and N should not be taken to be limiting.

FIG. 5 illustrates that the additional portion 415 of the state machine 430 includes storage structures 502, 504 to maintain state element values for inactive threads. Those virtual threads that are inactive and whose values are tracked in the additional storage structures 502, 504 are sometimes referred to herein as "sleeping" threads.

As is stated above in connection with FIG. 4, simplified state-selection logic 402, 404, 406 selects an appropriate output value 407 for the state element in response to an access request, such as a read request. Such simplified logic need not consider inactive state values held in inactive storage elements 502 and 504.

FIG. 5 illustrates that, in order to support the swap function provided by the state mechanism for a thread switch (discussed in further detail below), the active state elements 402, 404 and the inactive state elements 502, 504 are coupled together in a cross-bar configuration.

FIG. 5 illustrates that the illustrated state mechanism 430 may provide retrofit capability so that an SMT processor may support virtual multithreading. By providing a state mechanism 430 for each element of the architectural state, the SMT processor may be retrofitted to provide a virtual multithreading environment and to maintain architectural state information for each of the supported virtual threads.

FIG. 5 also illustrates the thread switch control logic via which at least one embodiment of the state mechanism 430 swaps an inactive state element value with an active state element value for a thread switch. FIG. 5 illustrates that the inactive state elements 502, 504 are coupled to the active state elements 402, 404 in a cross-bar configuration. Upon a thread switch, one inactive virtual thread (the "waking" thread) is to be switched in to become the new active thread on a given physical thread. By the same token, upon the thread switch the current active thread (the "dozing" thread) is to be switched out to become an inactive thread. As is stated above, the inactive threads are not dedicated to any particular physical thread. For this reason, the cross-bar configuration allows swapping of active and inactive state values such that an inactive thread that was previously active on a particular physical thread may be switched in to become the active virtual thread on another one of the physical threads.

FIG. 5 illustrates that each active state storage element 402, 404 is coupled to a data out line 511, 513, respectively. The data out lines 511, 513 provide the active state value to one of the inactive state storage elements 502, 504. Such data out line 511, 513 is used to deliver current state value to the inactive state element 502, 504, respectively, when a current virtual thread becomes inactive. By the same token, a thread switch update path 515, 517 provides the inactive value to become the new active value for the physical thread undergoing the thread switch.

FIG. 5 illustrates that the two active state data out lines 511, 513 may provide respective active values to a first mux 506 and a second mux 508. The select line for each mux 506, 508 reflects a "current thread" indicator that specifies which of the active state values 402, 404 is to be swapped out to become an inactive value. One of skill in the art will recognize that muxes 506 and 508 may be combined.

If the current thread indicator specifies that value of the first active state element 402 is to be swapped (that is, 402 holds the state element value for the dozing thread), then muxes 506 and 508 provide such value to inactive state element 0 502 and inactive state element 1 504, respectively. Otherwise, if the current thread indicator specifies that the value of the second active state element 404 is to be swapped (that is, 404 holds the state element value for the dozing thread), then muxes 506 and 508 provide such value to inactive state element 0 502 and inactive state element 504.

The value provided by muxes 506 and 508 will overwrite only one of the inactive state element values. That is, only the inactive state element 502, 504 whose value is to be swapped in as the new current value is updated to reflect the value received via the data out lines 511, 513. A write enable line for inactive state element 0 502 and inactive state element 1 504 each reflects a "waking thread" indicator. The waking thread indicator specifies which of the inactive state element 502, 504 values is to be swapped in as the new active state element value for the thread switch. In this manner, one of the inactive state element storage structures 502, 504 (that is, whichever structure 502, 504 holds the state element value for the waking thread) is updated to reflect the active state element value being swapped out for the dozing thread.

For at least one embodiment, the cross-bar coupling of the inactive state elements 502, 504 and the active state elements 402, 404 is such that the values are buffered. For example, each of the inactive state element storage structures 502, 504 and each of the active state element storage structures 402, 404 may be a flop structure. Each flop structure includes two latches, one of which is closed while the other is open. In this manner, the selected inactive state element 502, 504 may receive an update value yet may still pass on its prior value to the appropriate active state element 402, 404 as described immediately below.

The buffered inactive state element value to be swapped in as the new active state element value is provided from an inactive state element storage structure 502, 504 to a mux 510, 512, respectively. FIG. 5 shows that the value of inactive state element 0 502 is provided to mux 510 and mux 512.

Similarly, the value of inactive state element 1 504 is also provided to mux 510 and mux 512. A select line for each mux determines which value is output from the mux. One skilled in the art will recognize, of course, that muxes 510 and 512 may be combined.

For at least one embodiment, the select lines for muxes 510 and 512 reflect the waking thread indicator. If the first inactive state element 502 is to be swapped in, then the buffered value for the first inactive state element 502 is provided as an output from muxes 510 and 512 along output lines 515 and 517, respectively. These output paths 515, 517 reflect a thread switch update path via which an inactive state element value is "swapped in" as a new active value.

The value provided by muxes 515 and 517 will overwrite only one of the active state element values. That is, only the active state element 402, 404 whose value is to be swapped out to become an inactive value is updated to reflect the value received via the thread switch update lines 515, 517. A write enable line for active state element 0 402 and active state element 1 404 each reflects the "dozing thread" indicator. The dozing thread indicator specifies, as is stated above, which of the active state element 402, 404 values is to be swapped out to become an inactive state element value for the thread switch. In this manner, one of the active state element storage structures 402, 404 is updated to reflect the inactive state element value being swapped in for the waking thread.

One should note that the write enable lines for the active state element 0 402 and active state element 404 may also reflect a normal write update. That is, the active state elements 402, 404 may be updated either during a normal write update instructions (such as those instructions, for instance, that update the architectural state element during execution of the respective active thread) or as a result of the thread switch logic described above.

Figure 6:
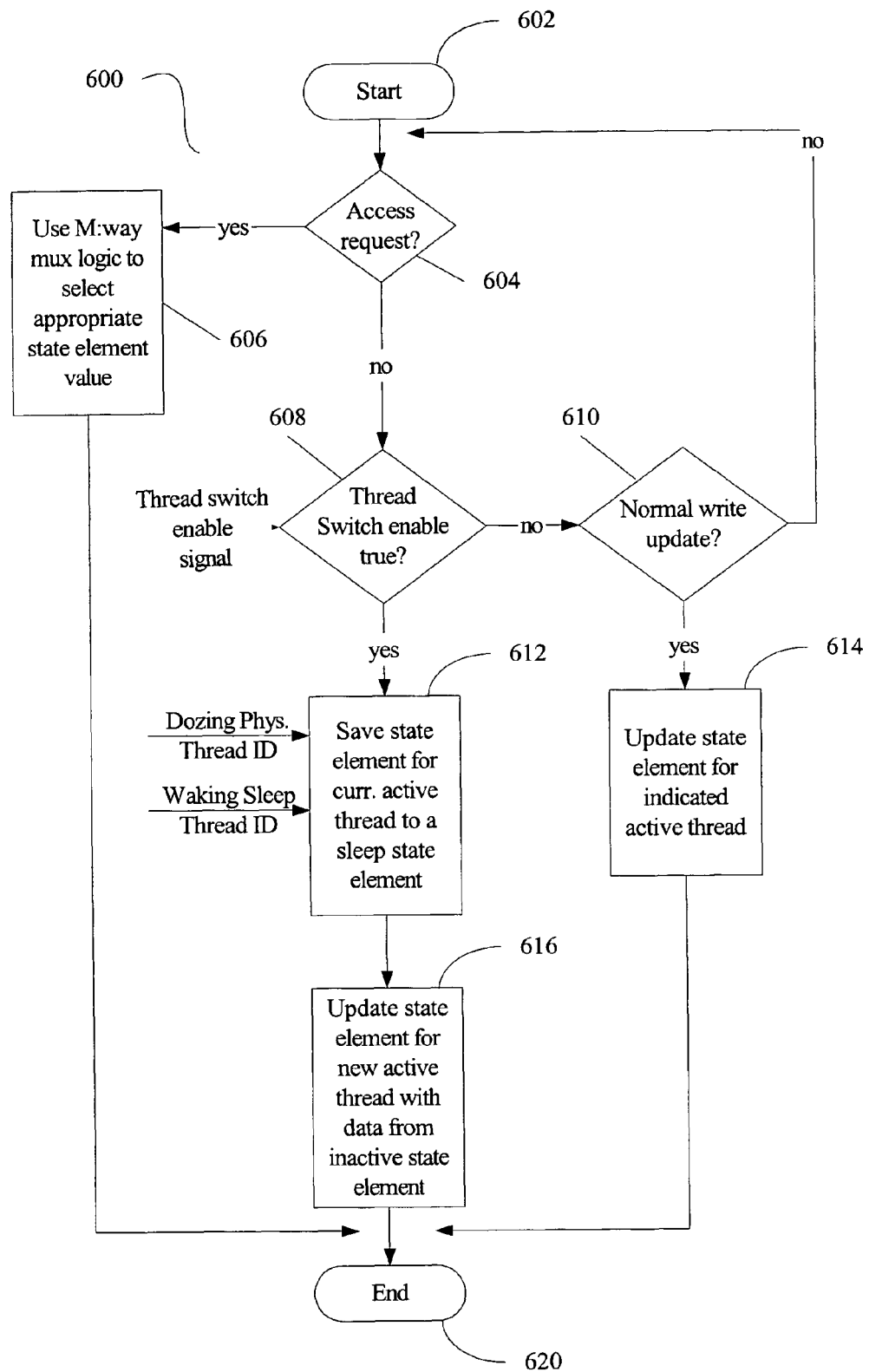
FIG. 6 is a flowchart illustrating at least one embodiment of a method for maintaining architectural state for a plurality of virtual software threads.

FIG. 6 is a flowchart illustrating a method 600 of maintaining architectural state elements for a plurality of virtual software threads supported on M physical threads. FIG. 6 is discussed herein along with reference to FIG. 1.

The method 600 may be performed, for example, by control logic 150 associated with a state mechanism such as the mechanisms 130, 430 illustrated in FIGS. 1 and 4, respectively. FIG. 6 illustrates control flow and data flow for the method 600 of updating the value of the state element 140 upon a normal write update and also upon a thread switch. FIG. 6 also illustrates that state-selection logic is invoked to provide the appropriate state element value upon an access request.

The method 600 may be performed by control logic 150 of a state mechanism 130 associated with each architectural state element in a processor. FIG. 6 illustrates that the method 600 may involve a three-signal interface to the control logic associated with each state mechanism 130. The interface may include a thread switch enable signal and a physical thread ID signal, which indicates the physical thread on which the dozing software thread is currently active. In addition, the interface may include a third signal, a waking thread sleep ID signal, which indicates which of the sleeping threads to wake up and become active.

Although FIG. 6 illustrates processing associated with only one state mechanism 130, one of skill in the art will recognize that the method 600 may be performed for each of multiple copies of a state mechanism 130 within a processor.

FIG. 6 illustrates that the method 600 begins at block 602 and proceeds to block 604. At block 604 it is determined whether access request for the state element has been received. An access request may be, for example, a read request. If such an access request has been received, processing proceeds to block 606. Otherwise, processing proceeds to block 608.

At block 606, the appropriate state element value is selected. The select logic utilized at block 606 may reflect, for example, the shaded M-way mux logic illustrated in FIGS. 4 and 5.

After the appropriate value is selected and provided as an output data value from the M-way mux (such as, for example, 406 in FIGS. 4 and 5) at block 606, processing ends at block 620.

At block 608, it is determined whether a thread switch enable signal is true. When a trigger event occurs in a processor (such as processor 104 in FIG. 1 or processor 404 in FIG. 4) such that the processor should switch out the virtual thread that is active on a given physical thread, a thread switch enable signal may be asserted. The processor may thus generate the thread switch enable signal when a sleeping virtual thread is to be activated as the active thread for a particular physical thread.

For at least one embodiment, the trigger event may be a processor event, such as a long latency cache miss. For at least one other embodiment, the trigger event may be the expiration of a TMUX multithreading timer.

If the thread switch enable signal is determined to be true or "on" at block 608, then processing proceeds to block 612 in order to perform the thread switch. If, however, the thread switch enable signal is not "on", then processing proceeds to block 610.

At block 610, it is determined whether a normal write update of the state element is indicated. If so, then processing proceeds to block 614. Otherwise, processing proceeds to block 604 and continues to monitor for an event. Of course, one skilled in the art will recognize that the polling loop from block 610 to block 604 need not necessarily be implemented as an active poll function. Instead, for instance, one of skill in the art will recognize that the assertion of the thread switch enable signal, as well as assertion of an access request or a write update, may be detected passively, such as through an interrupt or other exception processing.

One of skill in the art will also recognize that the determinations made at blocks 604, 608 and 610 need not necessarily be performed in the order illustrated. Indeed, any alternative ordering of the illustrated processing may be utilized, as long as it achieves the functionality illustrated in FIG. 6.

At block 612, the current active state element value for the physical thread undergoing the thread switch is saved as an inactive value. Processing then proceeds to block 616. At block 616, a currently inactive state element value is saved as the active value for the physical thread undergoing the thread switch. In this manner, the currently active value is swapped with a currently inactive value; when such processing is performed for all state elements, a swap of the architectural state is effected for a thread switch. Processing then ends at block 620.

At block 614, the state element is updated. Because a copy of the state element may be maintained for each physical thread, block 614 may perform selection logic in order to update the appropriate copy of the state element. (See for example, the use of a normal write update signal as a write enable signal for active state element 0 402 and active state element 1 404 in FIG. 5.) This normal write update signal may reflect an identifier that specifies a particular physical thread. From block 614, processing ends at block 620.

Figure 7:
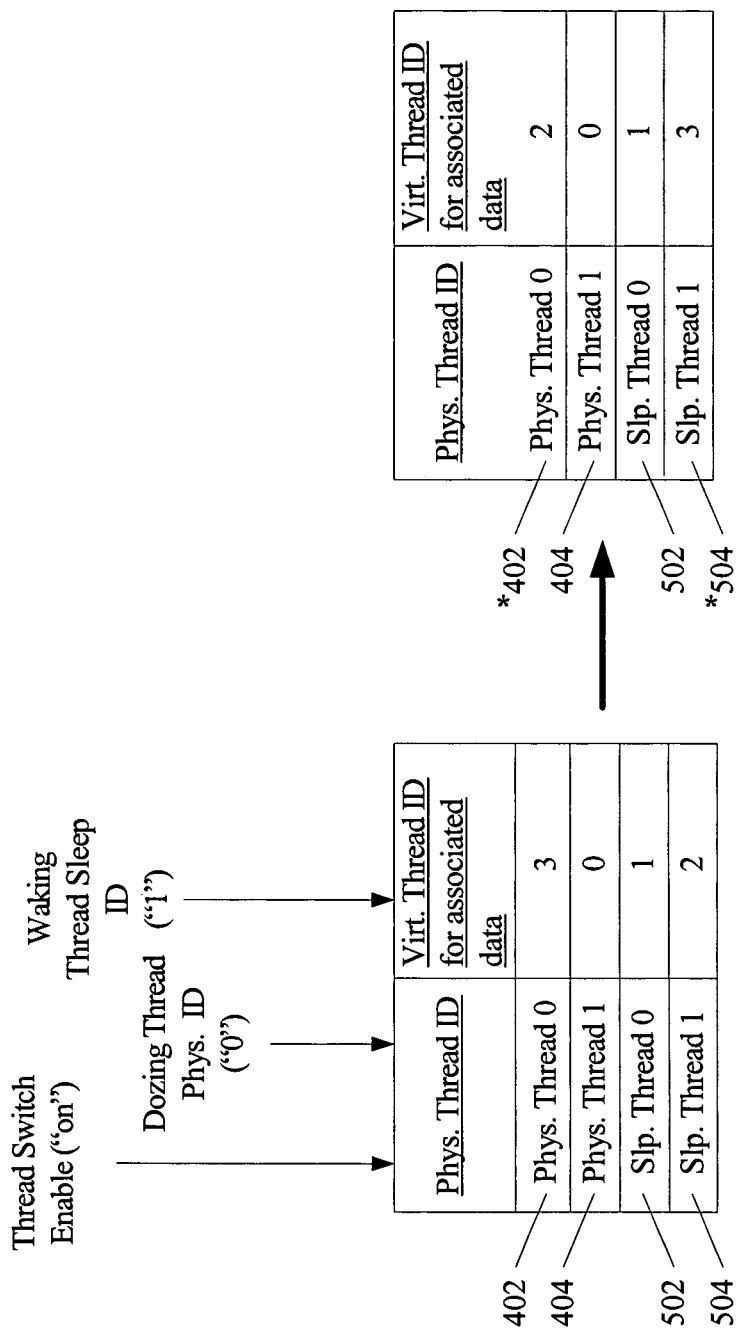
FIG. 7 is a block data flow diagram illustrating data values for an illustrative thread switching example.

FIG. 6 will now be discussed in connection with FIGS. 5 and 7 in order to provide an illustrative example of thread switch processing 612, 616 in a virtual multithreading environment. FIG. 7 is a block diagram illustrating the contents of active state element 0 402, active state element 1 404, inactive state element 0 502 and inactive state element 1 504 for an illustrative virtual multithreading example before and after a thread switch. "Inactive" state elements 502, 504 are referred to as "sleeping" state elements in FIG. 7.

For the example illustrated in FIG. 7, it is assumed that a processor (such as processor 104 illustrated in FIG. 1) is an SMT processor that provides two physical threads. For such example it is also assumed that the processor supports four SoEMT virtual threads. As is explained above, the example is for illustrative purposes only. One of skill in the art will recognize, of course, that the swap processing 612, 616 may be performed for any of M physical threads, which support N virtual SoEMT threads, where N>M.

FIG. 7 illustrates initial contents for the state elements 402, 404, 502, 504 and thus represents an initial state at the time that the thread switch enable signal is detected at block 608 for our example. The contents of the state elements 402, 404, 502, 504 illustrated in FIG. 7 are based on the illustrative assumption that four virtual threads (virtual thread ID 0-3) are mapped to two physical threads (physical thread 0-1). The initial state shown in FIG. 7 illustrates that virtual thread 3 is active on physical thread 0 and that virtual thread 0 is active on physical thread 1. Virtual thread 1 and virtual thread 2 are not active but are, rather, in an inactive, or "sleep," state. Each state element 402, 404, 502, 504 includes that value for the state element associated with the architectural state for its corresponding virtual thread.

For our example, assume that virtual thread 3, currently active on physical thread 0, has suffered a trigger event such as a long-latency cache miss. Such trigger event causes the processor to assert the thread switch enable signal.

At block 608, the assertion of the thread switch enable signal is detected and processing proceeds to block 612. For purposes of our example, consider that the physical thread ID signal, received at block 612, carries a value of "0." Also consider that the sleeping thread ID, also received at block 612, carries a value of "1." That is, due to the trigger event, the processor has decided to put the triggering virtual thread (thread 3) to sleep and to instead activate virtual thread 2 on physical thread 0.

The value of "0" for the physical thread ID signal, received at block 612, indicates that the active state element value 402 for physical thread 0 is to be modified. The inactive state value 504 for sleeping thread 1 is also to be modified, given the value of "1" for the sleeping thread ID signal (which was received as the "waking virtual thread id" signal at block 612). The state element values to be modified at blocks 612 and 616, given these input signal values, are denoted in FIG. 7 with asterisks. Such values are to be swapped.

FIG. 7 illustrates the change in values for active state element 0 402 and inactive state element 1 504 as a result of the swap processing at blocks 612 and 616. The change in values illustrated in FIG. 7 is based on the assertion of the physical thread ID value of "0" and the sleeping thread ID value of "1" discussed above. That is, the values are swapped, such that inactive state element 1 504 contains the value for virtual thread 3 (see block 612) and active state element 0 402 now contains the value for virtual thread 2 (see block 616). Processing then ends at block 620.

Figure 8:
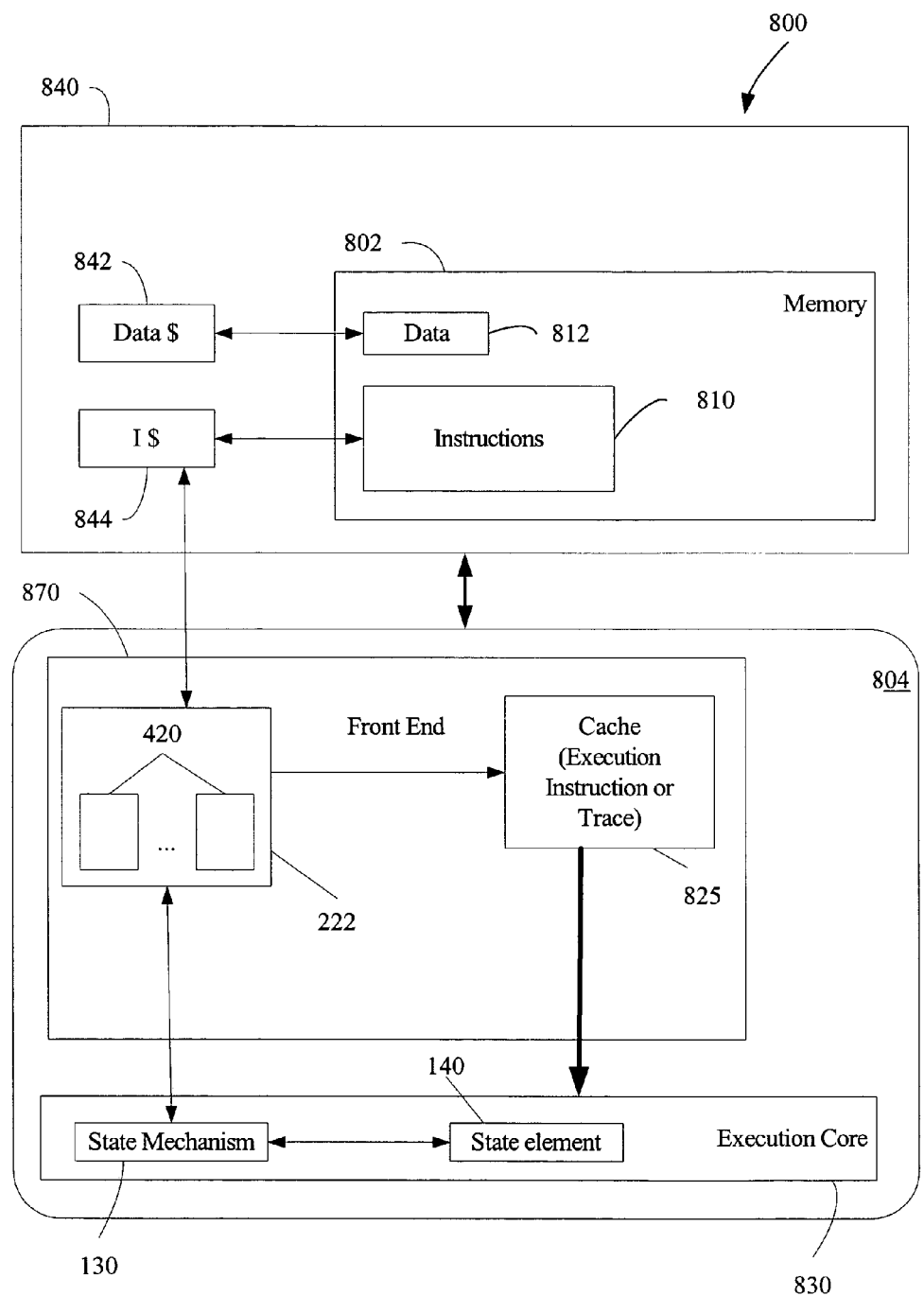
FIG. 8 is a block diagram illustrating at least one embodiment of a processing system capable of utilizing disclosed techniques.

FIG. 8 is a block diagram illustrating at least one embodiment of a computing system 800 capable of performing the disclosed techniques to maintain state element values for active and inactive virtual threads. The computing system 800 includes a processor 804 and a memory 802. Memory 802 may store instructions 810 and data 812 for controlling the operation of the processor 804.

Memory 802 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory 802 may store instructions 810 and/or data 812 represented by data signals that may be executed by processor 804. The instructions 810 and/or data 812 may include code for performing any or all of the techniques discussed herein.

The processor 804 may include a front end 870 along the lines of front end 120 described above in connection with FIG. 1. Front end 870 supplies instruction information to an execution core 830 and may include a fetch/decode unit 222 that includes M logically independent sequencers 420. For at least one embodiment, the front end 870 prefetches instructions that are likely to be executed. For at least one embodiment, the front end 870 may supply the instruction information to the execution core 830 in program order.

For at least one embodiment, the execution core 830 prepares instructions for execution, executes the instructions, and retires the executed instructions. The execution core 830 may include out-of-order logic to schedule the instructions for out-of-order execution. The execution core 830 may maintain all or a portion of the architecture state for each physical thread. For example, the execution core may maintain a register file of architecturally visible register values. Accordingly, state element 140 represents any type of structure that maintains all or part of the architectural state for physical threads, including a general register file, floating point register file, control registers, and the like. Of course, other elements of the architecture state may be maintained outside of the execution core 830, in other parts of the processor 804.

The execution core 830 may include retirement logic (not shown) that reorders the instructions, executed in an out-of-order manner, back to the original program order. This retirement logic receives the completion status of the executed instructions from the execution units (not shown) and processes the results so that the proper architectural state is committed (or retired) according to the program order.

As used herein, the term "instruction information" is meant to refer to basic units of work that can be understood and executed by the execution core 830. Instruction information may be stored in a cache 825. The cache 825 may be implemented as an execution instruction cache or an execution trace cache. For embodiments that utilize an execution instruction cache, "instruction information" includes instructions that have been fetched from an instruction cache and decoded. For embodiments that utilize a trace cache, the term "instruction information" includes traces of decoded micro-operations. For embodiments that utilize neither an execution instruction cache nor trace cache, "instruction information" also includes raw bytes for instructions that may be stored in an instruction cache (such as I-cache 844).

The processor 804 may include one or more state mechanisms 130 to maintain active and inactive values for architectural state elements, as described above.

The processing system 800 includes a memory subsystem 840 that may include one or more caches 842, 844 along with the memory 802. Although not pictured as such in FIG. 8, one skilled in the art will realize that all or part of one or both of caches 842, 844 may be physically implemented as on-die caches local to the processor 804. The memory subsystem 840 may be implemented as a memory hierarchy and may also include an interconnect (such as a bus) and related control logic in order to facilitate the transfer of information from memory 802 to the hierarchy levels. One skilled in the art will recognize that various configurations for a memory hierarchy may be employed, including non-inclusive hierarchy configurations.

It will be apparent to one of skill in the art that, although only an out-of-order processing system 800 is illustrated in FIG. 8, the embodiments discussed herein are equally applicable to in-order processing systems as well.

The foregoing discussion describes selected embodiments of methods, systems and apparatuses to maintain architectural state values for a plurality of virtual software threads within a processor. In the preceding description, various aspects of methods, system and apparatuses have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

Embodiments of the method may be implemented in hardware, hardware emulation software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

At least one embodiment of an example of such a processing system is shown in FIG. 8. Sample system 800 may be used, for example, to execute the processing for a method of maintaining architectural state values for active and inactive virtual software threads, such as the embodiments described herein. Sample system 800 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the present invention in its broader aspects.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. An apparatus comprising: a processor including:
M simultaneous multithreading (SMT) physical threads to support N switch-on-event software threads, wherein N is greater than M, and wherein M is an integer greater than one;
a first set of hardware storage structures to maintain M active values for each of a plurality of elements of an architecture state for the processor, the M active values to be associated with M of the N switch-on-event software threads to be currently active;
a second set of hardware storage structures coupled to the first set of storage structures in a cross-bar configuration, the second set of hardware storage structures to maintain N-M inactive values for each of the plurality of elements of the architecture state for the processor wherein the cross-bar configuration includes an M:1 multiplexer; and
hardware thread switch control logic to perform a timing-critical thread switch, the hardware thread switch control logic to modify a selected one of said N-M inactive values for each of the plurality of elements and a selected one of said M active values for each of the plurality of elements responsive to a thread switch indicator signal being enabled to each of the plurality of elements, wherein the timing-critical thread switch satisfies a critical path timing requirement for accessing of the architectural state for the processor.

2. The apparatus of claim 1, wherein the control logic is further to swap the value of the selected inactive value and the selected active value responsive to the thread switch indicator signal being enabled to each of the plurality of elements.

3. The apparatus of claim 1, wherein: said control logic is further to select from among the M active values to provide an output value responsive to an access request.

4. The apparatus of claim 1, wherein: said control logic is further to receive a virtual thread identifier that indicates the selected inactive value.

5. The apparatus of claim 1, wherein: said control logic is further to receive a physical thread identifier that indicates the selected active value.

6. The apparatus of claim 1, wherein: said control logic is further to modify the value of a selected one of the M active values responsive to a write update indicator.

7. The apparatus of claim 1 wherein the timing-critical thread switch of the selected one of the M active state element values with the selected one of the N-M inactive state element values is to permit the selected one of the N-M inactive switch-on-event software threads to run instead of the selected one of the M active switch-on-event software threads to cover the latency of a cache miss in the selected one of the M active switch-on-event software threads.

8. A processor comprising:
an integrated circuit including, a first physical thread and a second physical thread;
a number of virtual threads, wherein the number of virtual threads is greater than two;

a first active register associated with the first physical thread to hold a first active value for a control register, wherein the first active value is to be associated with a first virtual thread of the number of virtual threads;

a second active register associated with the second physical thread to hold a second active value for the control register, wherein the second active value is to be associated with a second virtual thread of the number of virtual threads;

storage logic to hold an inactive value for the control register, wherein the inactive value is to be associated with a third virtual thread of the number of virtual threads; and a bifurcated hardware swap mechanism coupled to the first active register, the second active register, and the storage logic, wherein the bifurcated hardware swap mechanism is capable of swapping the inactive value with the first active value in response to a switch indicator associated with a trigger event occurrence for the first virtual thread and swapping the inactive value with the second active value in response to a switch indicator associated with a trigger event occurrence for the second virtual thread, and wherein the bifurcated hardware swap mechanism includes a multiplexer with two inputs and one output.

9. The processor of claim 8, wherein: the swap mechanism is coupled between the storage logic and the first and second active registers in a cross-bar configuration.

10. The processor of claim 9, further comprising control logic to modify one of the first or second active values with an update value.

11. The processor of claim 8, further comprising: selection logic coupled to the first and the second active registers to select the first active state value as an output value responsive to a first access operation associated with the first physical thread and to select the second active state value as the output value responsive to a second access operation associated with the second physical thread.

12. The processor of claim 11, wherein said selection logic is further to exclude consideration of the inactive state value.

13. A method, comprising:
maintaining for an architectural state element an active state element value for each of M physical threads in a first hardware storage structure within a processor, wherein M is an integer value greater than one, and wherein the architectural state element is part of a processor state that is to enable a software entity to view each of the M physical threads as separate logical processors;

maintaining for the architectural state element an inactive state element value for each of N-M inactive software threads in a second hardware storage structure coupled to the first storage structure in a cross-bar configuration within the processor, wherein N is greater than M; and performing, with a bifurcated hardware swap mechanism including a multiplexer having M inputs and one output, a swap of a selected one of the M active state element values with a selected one of the N-M inactive state element values responsive to a thread switch indicator associated with a trigger event occurrence for the corresponding selected one of the M physical threads.

14. The method of claim 13, wherein: performing a swap further comprises: saving the selected active state element value as the selected inactive state element value.

15. The method of claim 13, wherein: performing a swap further comprises: saving the selected inactive state element value as the selected active state element value.

16. The method of claim 13, further comprising: receiving a physical thread identifier to indicate the selected active state element value.

17. The method of claim 13, further comprising: receiving a waking thread identifier to indicate the selected inactive state element value.

18. The method of claim 13, further comprising: selecting an appropriate one of the active state element values responsive to an access request.

19. The method of claim 18, wherein: said selecting further comprises declining consideration of the inactive state element values.

20. The method of claim 13, further comprising: modifying one of the active state element values.

21. A system, comprising:
a memory system; and
a processor comprising:
    hardware to maintain a plurality of complete sets of active values for an architecture state of the processor;
    hardware to maintain a plurality of complete sets of inactive values for the architecture state of the processor; and
    hardware to atomically swap one of the plurality of complete sets of inactive values with one of the plurality of complete sets of active values in response to a thread switch indicator associated with a trigger event occurrence for a thread corresponding to the one of the plurality of complete sets of active values, wherein the hardware to atomically swap one of the plurality of complete sets of inactive values with one of the plurality of complete sets of active values includes a multiplexer with a number of inputs equal to a number of the plurality of complete sets of active values.

22. The system of claim 21, wherein: the memory system further comprises a dynamic random access memory.

23. The system of claim 21, wherein the plurality of complete sets of inactive values include N-M complete sets of inactive values wherein N indicates a number of switch-on-event software threads that may run on the processor and M indicates a number of physical threads in the processor, where N is greater than M.

24. The system of claim 21, wherein hardware adapted to swap one of the plurality of complete sets of inactive values with one of the plurality of complete sets of active values is capable of swapping the one of the plurality of complete sets of inactive values with any of the plurality of compete sets of active values.

25. A non-transitory machine readable medium configured for use with a processing system, and storing instructions accessible to a physical processor in the processing system, the instructions when read by the processing system cause the processing system to perform procedures comprising:
maintaining an active state element value for each of M simultaneous multithreading (SMT) threads running concurrently in M separate logical contexts to make the physical processor appear as M logical processors, wherein M>1;

maintaining an inactive state element value for each of N-M inactive switch-on-event multithreading (SoEMT) threads to run in any one of the M separate logical contexts, wherein N>M;

monitoring for an SoEMT triggering event in the processor; and performing a timing-critical swap of a selected one of the M active state element values with a selected one of the N-M inactive state element values responsive to the SoEMT triggering event in the processor, wherein the timing-critical swap satisfies a critical path timing requirement for accessing of architectural state in the processor.

26. The non-transitory machine readable medium of claim 25 wherein the SoEMT triggering event in the processor is a cache miss.

27. The non-transitory machine readable medium of claim 26 wherein the timing-critical swap of the selected one of the M active state element values with the selected one of the N-M inactive state element values is to permit the selected one of the N-M inactive SoEMT threads to run in the selected one of the M separate logical contexts to cover the latency of a cache miss in the selected one of the M active SMT threads.

28. The non-transitory machine readable medium of claim 25 wherein the SoEMT triggering event in the processor is an execution of a particular instruction in the selected one of the M active SMT threads.

29. The non-transitory machine readable medium of claim 28 wherein the timing-critical swap of the selected one of the M active state element values with the selected one of the N-M inactive state element values is to permit the selected one of the N-M inactive SoEMT threads to run in the selected one of the M separate logical contexts to cover the latency of the execution of the particular instruction in the selected one of the M active SMT threads.

30. The non-transitory machine readable medium of claim 25 wherein the SoEMT triggering event in the processor is an expiration of a time-multiplex (TMUX) multithreading timer.

\* \* \* \* \*